COMPACT LCR COMPONENT AND METHOD OF MAKING

Filed Aug. 7, 1969 3 Sheets-Sheet 1

COMPACT LCR COMPONENT AND METHOD OF MAKING

United States Patent Office 3,555,464
Patented Jan. 12, 1971

3,555,464
COMPACT LCR COMPONENT AND METHOD OF MAKING

Tsutomu Maeda, Kiyoshi Watanabe, Tadaharu Akino, Eiitsu Ito, and Hisashi Osada, Tokyo, Japan, assignors to TDK Electronics Co., Ltd., Tokyo, Japan, a corporation of Japan Filed Aug. 7, 1969, Ser. No. 848,224
Int. Cl. H03h *5/06;* H03f *15/02, 15/10*
U.S. Cl. 333—70 3 Claims

ABSTRACT OF THE DISCLOSURE

An electric composite component comprising a dielectric base plate having a cut-off part at an edge and at least a pair of projections at the other edge, an inductance element of a drum-shaped magnetic core with a coil in its intermediate groove and mounted to the plate at the cut-off so as to receive plate edges in the groove, and a condenser element of electrode plates respectively on each surface of the plate between the cut-off and projections. Each of lead wires of the coil is led over each condenser electrode on each plate surface to each of the projections and wound up thereto. A method of producing the component includes steps of applying a solder layer to the lead wires where contacting electrodes after removing insulation coating, preheating elements, and dipping the whole in a melted solder bath so as to simultaneously solder the contacting points of lead wires and electrodes.

This invention relates to a structure of an electrical composite component including an inductance element, and to a process for producing the same.

In an electrical composite component including a coil using a high frequency magnetic core as an inductance, there have been defects in the production that a large space is required for mounting the coil and that a greater care is required to solder respective ends of the coil. Further, such inductance element has been fitted to electrodes on a base plate of electrical composite component including a condenser and resistance, by means of lead wires soldered to each electrode provided at each end of the high frequency magnetic core or lead wires bonded in a concave portion provided at each end of the high frequency magnetic core and, thus, the element has been accompanied with a defect that the assembling operation has been complicated.

The present invention has been suggested to eliminate the above mentioned defects.

Thus, the main object of the present invention is to provide an electrical composite component in which the coil fitting space is made much smaller, its structure is simplified and the assembling operation therefor is made much easier.

Another object of the present invention is to provide an efficient process for producing the electrical composite components.

The present invention shall now be explained with reference to the drawings in which.

Figure 1A:
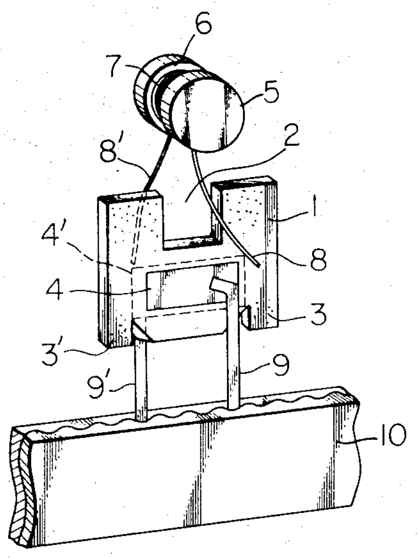
FIG. 1A is a perspective view showing an electrical composite component in an assembling state according to the present invention.
Figure 1B:
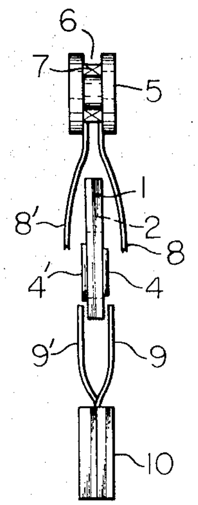
FIG. 1B is a side view of the same.
Figure 2:
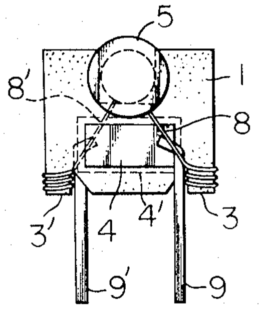
FIG. 2 is an elevation of the same.

In FIGS. 1A, 1B and 2, 1 is a ceramic base plate provided at its upper part with a concave or cut portion 2 for fitting therein a magnetic core and at its lower part with convex or projected portions 3 and 3′ for winding up end parts of a coil. Electrodes 4 and 4′ for forming a condenser element are provided respectively on each surface of the above mentioned ceramic base plate 1 in an opposed position to each other.

5 is a drum-shaped magnetic core having a winding concave or groove 6 between both disk-shaped end surfaces so that an insulation coated copper wire 7 will be wound on said groove to form a coil. 8 and 8′ are lead wires of said coil. The winding groove 6 of the magnetic core having the thus formed coil is inserted into the concave cut 2 of the base plate 1.

Then, the lead wires 8 and 8′ of the coil, with the insulation coating removed, are respectively processed to have a solder layer around them, are led over the electrodes 4 and 4′ of said condenser element while being contacted therewith to the projections 3 and 3′ of the ceramic base plate 1, and with the respective ends are wound up around the projections, thereby the magnetic core will be fixed to the ceramic base plate 1.

9 and 9′ are external pull-out lead wires fitted in advance to a lead wire clipper 10.

Figure 3:
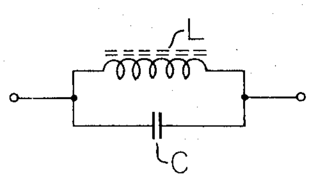
FIG. 3 is an equivalent circuit diagram of the same.

The ceramic base plate provided with thus formed coil is held between both external pull-out lead wires and is preheated. A flux material is applied to respective contact portions between the respective lead wires 8, 8′ and 9, 9′ and the electrodes 4, 4′, and the whole is then dipped into a melted solder bath, so that the lead wires 8 and 8′ of the coil, the external pull-out lead wires 9 and 9′ and the electrodes 4 and 4′ of the condenser element will be simultaneously soldered. Thus, such electrical composite component having such an equivalent circuit consisting of an inductance element L and condenser element C as shown in FIG. 3 is produced.

The above mentioned producing process can be applied not only to an electrical composite component including a single inductance element and condenser element, but also to various electrical composite components, each of which being different depending on various numbers and arrangements of the magnetic core fitting cut portion provided in the ceramic base plate, the projections for winding up the lead wires of the coil and the electrode formed on the ceramic base plate.

Figure 4:
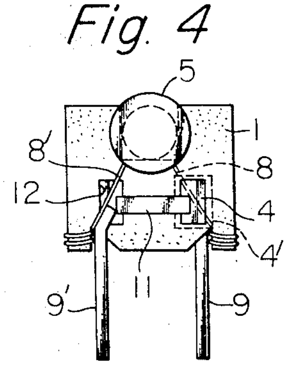
FIG. 4 is an elevation of another embodiment of the present invention.
Figure 5:
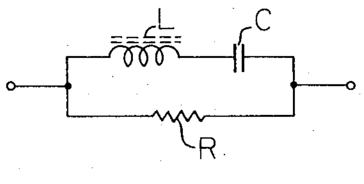
FIG. 5 is an equivalent circuit diagram of the same.

FIG. 4 shows another embodiment of the present invention. An electrode 12 for an external pull-out lead wire is provided on one surface of the ceramic base plate 1, and a resistance element 11 is bridged between said electrode 12 and an electrode 4 forming a part of the condenser element, so that such composite component consisting of L, C and R elements as is shown in FIG. 5 will be made.

Figure 6:
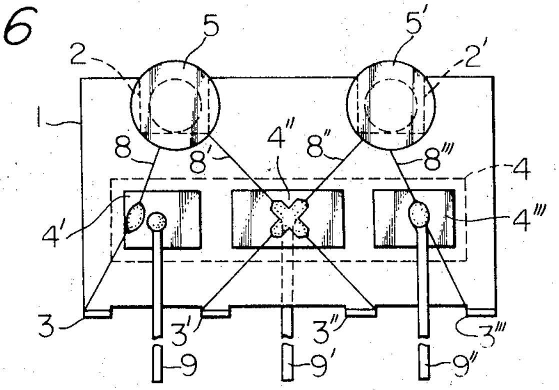
FIG. 6 is an elevation of a further embodiment of the present invention.
Figure 7:
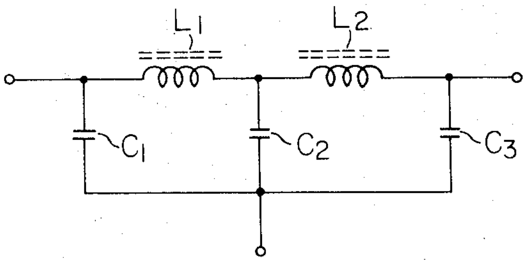
FIG. 7 is an equivalent circuit diagram of the same.

FIG. 6 shows another embodiment of the present invention. A ceramic base plate 1 is provided in its upper edge with a plurality of cut portions 2 and 2′ for fitting magnetic cores and in its lower edge with projected portions 3, 3′, 3″ and 3‴ for winding up lead wires, a common electrode 4 for a condenser element is provided on a surface of the ceramic base plate 1, electrodes 4′, 4″ and 4‴ separated from one another are provided on the other surface, a drum-shaped magnetic core on which is wound a coil is fitted in each cut portion in the upper part, lead wires 8 and 8' of a magnetic core 5 are wound up respectively on the projected portions 3 and 3'', lead wires 8'' and 8''' of the second magnetic core 5' are wound up respectively on the projected portions 3' and 3''' and the lead wires of the coils, the electrodes and the external pull-out lead wires are soldered in the same manner as is described above so that such electrical composite component as is shown in FIG. 7 will be obtained.

Figure 8:
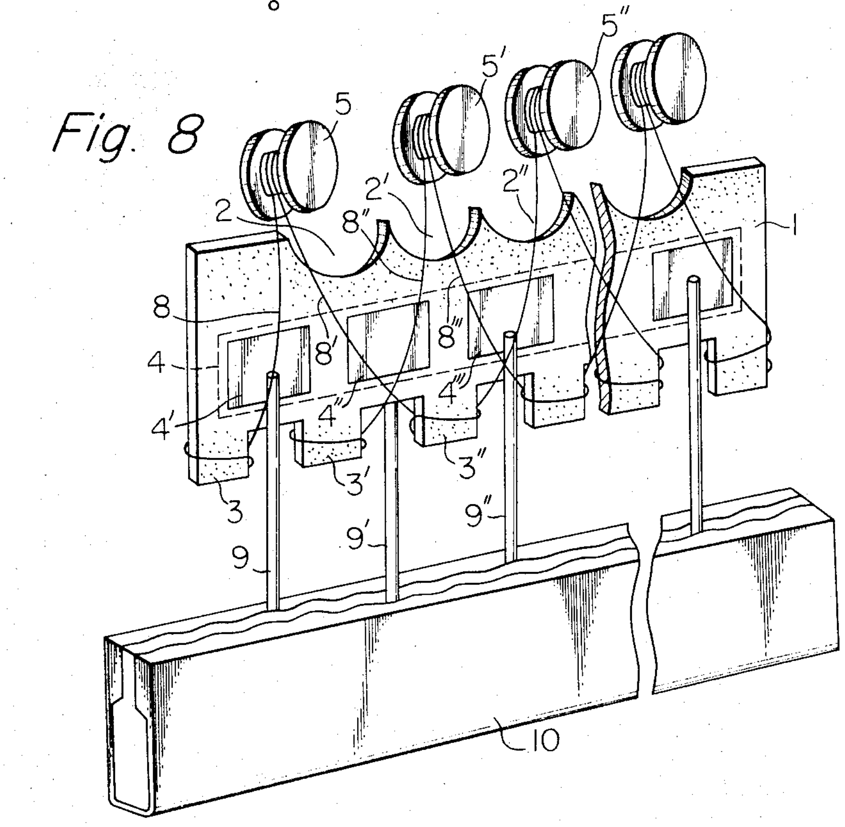
FIG. 8 is a perspective view of an embodiment of the present invention as applied to a lumped constant delay line.
Figure 9:
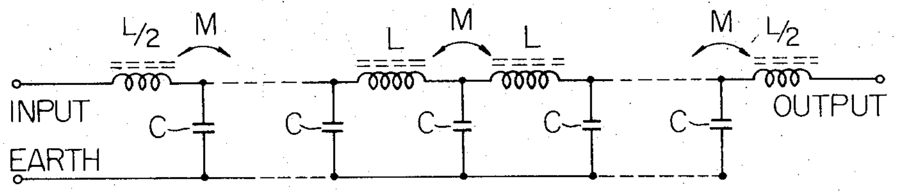
FIG. 9 is an equivalent circuit diagram of the same.

FIG. 8 shows a further embodiment of the present invention, wherein the shape of each cut portion in the upper part of the ceramic base plate 1 is made to be arcuate. The number of coils to be fitted in this case is increased to be larger than in the case of FIG. 6 and the number of electrodes forming condenser elements and the number of projected portions to wind up the ends of lead wires are also correspondingly increased, so as to be adapted for use in a lumped constant delay line. Its manufacturing method is the same as is described in the above.

Figure 10:
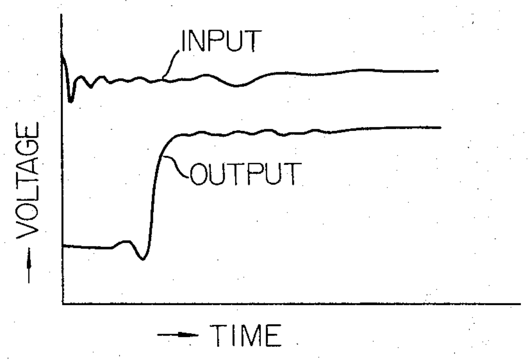
FIG. 10 is a pulse response characteristic diagram of the case of FIG. 8.
Figure 11:
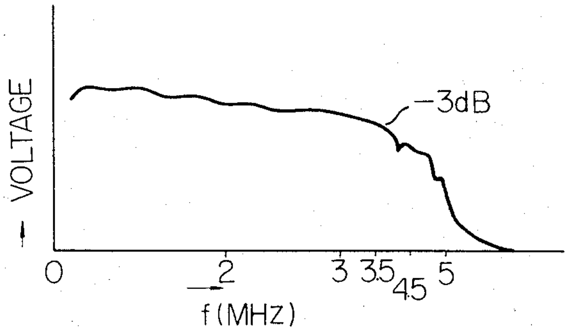
FIG. 11 is a frequency characteristic diagram of the same.

In such lumped constant delay line as described above, respective members of the magnetic core fitting cut portions formed in the dielectric base plate 1, of the projected portions for winding up lead wires, and of the electrodes forming the condsenser elements are different depending on the delay time and rise time of the delay line. Exemplary pulse response characteristics and frequency characteristics in an experiment of the invention are shown in FIGS. 10 and 11, respectively. In this experiment, in order to form a delay line of a characteristic impedance of 1.8 KΩ, delay time of 0.8μsec. and rise time of 0.2μsec., 8 condensers were formed on a dielectric base plate (15 mm. high, 50 mm. wide and 0.35 mm. thick) of titanium oxide and drum-shaped cores (of a diameter of 4 mm., height of 3 mm., winding groove depth of 1.5 mm. and core depth of 1.5 mm.) of an Ni-Cu-Zn type ferrite were arranged with a combination coefficient of 0.24 between adjacent coils on this base plate.

The present invention has features that no base member for fitting coils and condensers is required, the component can be made small and light, the ends of the coil and external pull-out lead wires can be soldered at once with the electrodes of the condenser, therefore, the mass-productivity is high and the production cost can be reduced.

What is claimed is:

1. An electrical composite component comprising a base plate made of a plate-shaped ceramic dielectric, said base plate being provided at a side edge with at least one cut portion for fitting therein a magnetic core, with a plurality of projections for winding up lead wires of coils on the other side edge, and with electrodes respectively on each surface for forming at least one condenser between said cut portion and projections, and a drum-shaped magnetic core, said magnetic core having a winding groove between both end surfaces, in which groove a coil is formed by winding an insulation coated copper wire, said winding groove of magnetic core having therein said coil being fitted in the cut portion of said ceramic dielectric base plate, the ends of lead wires of said coil having solder layer mode in advance being wound up on the projections of said base plate and said lead wires being fixed in their intermediate parts together with external pull-out lead wires respectively to each of said electrodes.

2. An electrical composite component according to claim 1, wherein one of said electrodes on one side on one surface of said ceramic dielectric base plate being formed in two separated portions and connected with each other through a resistance element.

3. A process for producing an electrical composite component consisting of a plate-shaped base plate of a ceramic dielectric provided with at least one cut portion for fitting a magnetic core at an edge, with a plurality of projections for winding up lead wires of coils at the other edge and with respective electrodes for forming a condenser element on both surfaces, comprising a step of inserting the winding groove of a drum-shaped magnetic core on which a coil is wound into said cut portion for mounting a magnetic core, a step of pulling out the lead wires of said coil on both sides of said plate-shaped base plate and winding up the ends of said lead wires on the respective projections of the base plate so as to contact said electrodes, a step of bringing a plurality of external pull-out lead wires held in advance by lead wire holding parts into contact wtih said respective electrodes and a step of simultaneously soldering said lead wires of the coil, electrodes and external pull-out lead wires.

References Cited

UNITED STATES PATENTS

| | | | |
|---|---|---|---|
| 2,694,185 | 11/1954 | Kodama | 333—70R |
| 2,751,444 | 6/1956 | Koch | 317—256X |
| 3,042,846 | 7/1962 | Lawson | 317—256 |
| 3,217,276 | 11/1965 | Cooper et al. | 333—70R |
| 3,332,048 | 7/1967 | Renskers | 336—65 |

HERMAN K. SAALBACH, Primary Examiner

W. H. PUNTER, Assistant Examiner

U.S. Cl. X.R.

317—256; 336—65, 192